Feb. 8, 1938.    J. T. ABBOTT    2,107,844
POWER DEVELOPING UNIT FOR AUTOMOTIVE VEHICLES
Filed Feb. 24, 1937    3 Sheets-Sheet 1
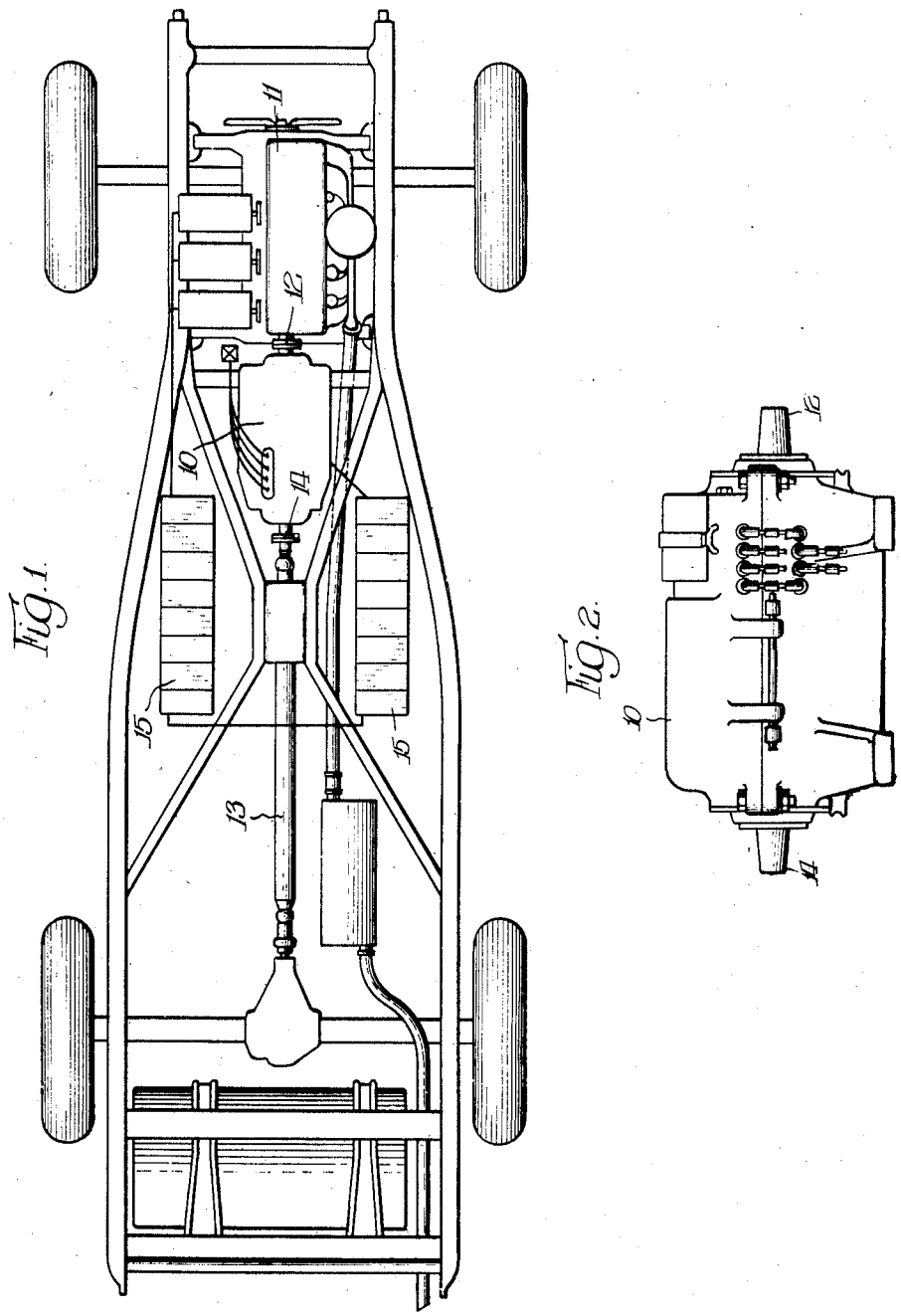
Inventor:
John T. Abbott.
By Cromwell, Greist + Warden
Attys.

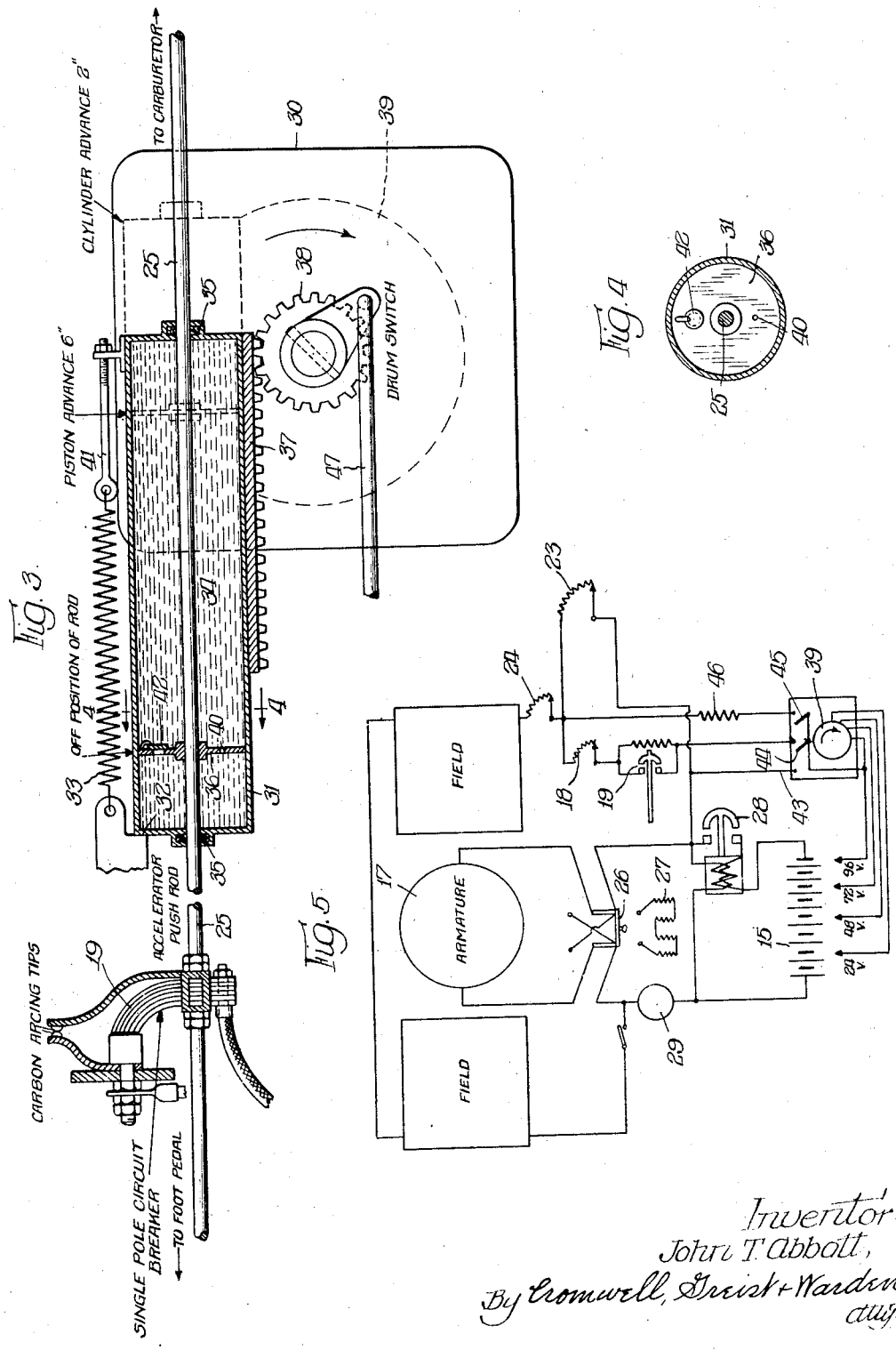

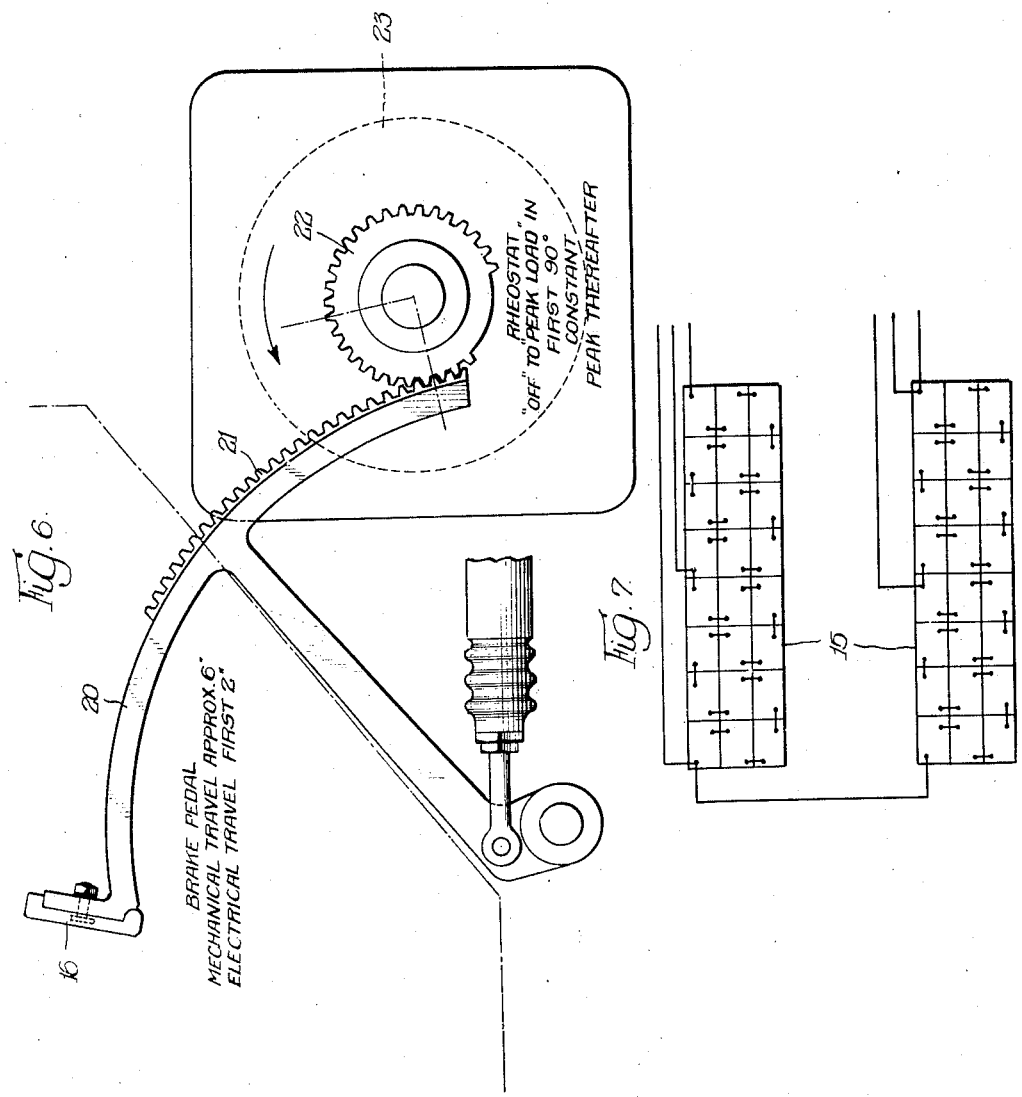

Patented Feb. 8, 1938

2,107,844

UNITED STATES PATENT OFFICE 2,107,844

POWER DEVELOPING UNIT FOR AUTO-
MOTIVE VEHICLES

John T. Abbott, Chicago, Ill.

Application February 24, 1937, Serial No. 127,480

9 Claims. (Cl. 290—17)

This invention has to do with automotive vehicles and is particularly concerned with the motive means employed in such vehicles.

The internal combustion engine which is used today in practically all automotive vehicles is not economical in its consumption of fuel, particularly when starting up under load, and requires the addition of a variable speed transmission in order to produce sufficient power for starting.

The object of the present invention is to provide a power developing unit, in the form of a combined internal combustion engine and dynamoelectric machine, which requires no transmission, gives smooth, rapid and powerful acceleration, and is economical in its consumption of fuel.

The new unit consists of a small internal combustion engine in combination with a dynamoelectric machine which operates under certain conditions as a motor and under other conditions as a generator. The internal combustion engine and the dynamoelectric machine are coupled together with the propeller shaft of the vehicle in a direct one-to-one drive and are operatively associated with automatically correlating devices which cause the dynamoelectric machine to act at times as a booster and at other times as a brake.

While the foregoing statements are indicative in a general way of the nature of the invention, other more specific objects and advantages will be evident to those skilled in the art upon a full understanding of the construction, arrangement and operation of the new unit.

In the accompanying drawings:

Fig. 1 is a plan view of an automobile chassis, showing the general arrangement of the internal combustion engine, dynamoelectric machine and storage batteries;

Fig. 2 is a side view of the dynamoelectric machine;

Fig. 3 is a partially sectioned side view of the acceleration correlator;

Fig. 4 is a transverse section, taken on the line 4—4 of Fig. 3;

Fig. 5 is a diagram of the electric circuit employed;

Fig. 6 is a side view of the brake correlator; and

Fig. 7 is a diagram showing the way in which the storage batteries are connected together.

The dynamoelectric machine 10, which is combined with the internal combustion engine 11, acts in the four-fold capacity of power booster, power conserver, current generator and brake. It is especially applicable to automobiles, trucks and buses, but it will of course be appreciated that it can be used in practically all fields of transportation. The dynamoelectric machine 10, which for brevity will hereinafter be referred to as the booster, is connected directly to the engine 11 by means of a coupling 12, replacing both the usual clutch and the usual transmission. At its rear end the booster is connected directly to the propeller shaft 13 of the vehicle by means of a coupling 14. The electric current used in operating the booster 10 is stored in a number of batteries 15, and the booster is coupled up with the batteries through certain hereinafter described controlling devices which automatically correlate the operation of the booster with that of the engine.

The principal purpose of the booster 10 is to conserve energy that would otherwise be wasted in coasting and braking and to use this conserved energy in starting and accelerating. The principle employed is one of regenerative braking. Instead of wasting the energy of momentum through the development of heat incidental to frictional braking, as in the present automobile, the booster when functioning as a generator serves as the vehicle's major braking instrumentality, charging the batteries which in turn supply this current back to the booster when acting as a motor, thus in a sense recreating the momentum previously lost in braking. The booster is of such design as to develop considerable power at low speeds, with the result that no variable speed transmission gears are needed and even the usual clutch may be dispensed with.

The operation of the improved power unit—which embraces both the booster 10 and the engine 11—will now be described in a general way. When the vehicle is under way and it is desired to bring it to a stop the brake pedal 16 (see Fig. 6) is depressed. The application of this pedal closes the circuit on a graduated scale to the batteries 15. Before application of the pedal the rotating armature 17 of the booster (see Fig. 5) will have been rotating freely with the engine 11, with no other major function than that of a fly wheel for the latter.

When the booster 10 is brought into play as a generator there are three different types of charges which it produces. The first type of charge is one which is taking place while the vehicle is being operated by the engine 11 and the booster 10 is turning without appreciable resistance as a fly wheel for the engine. During such turning movement the booster is hooked up in such a way in the electric circuit as to provide a small floating charge for the battery, equivalent in a general way to the charge ordinarily obtained from the present car generator. This load has no substantial brake effect on the engine. The purpose in having the booster so connected as to produce this low charging rate under ordinary driving conditions is to effect a constant electrolytic action in the batteries 15 and thereby render the same more readily susceptible to the sudden increase in the charging rate which is brought about upon full brake application. Another purpose of this floating charge—which may be say 1 ampere—is that through a manual adjustment which may be made through a field rheostat 18 (see Fig. 5) the amount of the charge may be increased up to approximately 30 amperes at seasonal or intermittent intervals, if and when necessary.

The second type of charge which takes place in conjunction with the booster 10 is at the time of stopping, when the operator's first manual move is to remove his foot from the accelerator. This automatically closes a single pole circuit breaker 19 (see Figs. 3 and 5) and increases the floating charge to the batteries by a predetermined amount, say about 30 amperes, by shunting out a fixed resistor in the field circuit. This increase in the charging rate further conditions the batteries for the subsequently applied and hereinafter described braking charge while at the same time exerting some braking action on the car.

The third type of charge comes with the application of the brake pedal 16. The arcuate portion 20 of the brake pedal (see Fig. 6) is extended in the form of a rack 21 which engages with a pinion 22 on a rheostat 23 (see Fig. 5). When the pedal 16 is depressed the electrical circuit which includes the rheostat 23 is closed and the charging rate is increased, reaching a peak of 300 amperes at the end of the first two inches of pedal movement, which pedal movement results in a turn of the rheostat 23 of about 90°. This high charging rate of the booster 10 produces a very substantial braking action on the propeller shaft 13 of the vehicle, sufficient to bring the latter to a smooth stop. Further depression of the pedal maintains this peak electrical charge and consequent braking action, and at the same time brings into action the regular braking equipment of the car, which braking equipment may be of any approved design. It is therefore possible to have electrical braking only, or electrical braking and mechanical braking at the same time. As the speed of the car is reduced the electrical braking decreases proportionately, eventually disappearing completely and necessitating mechanical braking in order to effect a complete stop. This is accomplished automatically through the hook-up provided with the pedal 16, the operator merely using the pedal 16 in the ordinary way, whereupon the mechanical braking action is caused to increase as the electrical braking action decreases due to loss of speed. Most of the braking action required will be produced electrically however.

An even electrical braking action is obtained by arranging another field rheostat 24 (see Fig. 5) in series with the brake rheostat 23. This rheostat 24 is under fly-ball governor control and serves at high speeds of the power unit to reduce the field strength, which reduction of course modifies the charging rate. As the governor controlling the rheostat 24 slows up the latter acts to increase the field strength. This control provides a practically constant electrical braking effect at any given position of the brake pedal, just as with a mechanical brake, which braking effect the operator can increase or decrease at will by varying the position of the pedal. Its secondary purpose is to avoid the violent braking action which might otherwise result should an inexperienced operator suddenly jam down on the brake pedal.

When the vehicle is brought to a complete stop both the booster 10 and the engine 11 will also come to rest. The fuel feeding means for the engine 11 is of such character as to entirely shut off the flow of fuel upon release of the accelerator push rod 25 (see Fig. 3). By thus eliminating any idling operation of the engine 11 while the car is motionless a considerable saving of fuel is effected.

The current which the batteries 15 receive from the booster 10 when the latter is functioning in the capacity of a generator is used when starting off again, whether the starting takes place immediately upon stopping or some time thereafter. Under certain infrequently met conditions, such as when descending a long grade in mountainous country, there may be danger of overcharging the batteries 15 through the application of more or less constant pressure on the brake pedal 16, which pressure will result in a high charging rate for the booster 10. Any suitable means, such as a small red light on the instrument board controlled by a thermal switch connected with the battery cells, may be employed to warn the operator of this overcharge, whereupon he can either cut out the entire electrical circuit by opening the main switch 26 (see Fig. 5) and thereafter utilize only his mechanical brake supplemented by the drag of the engine 11, or he may throw this switch 26 to a position wherein it will cut in a bank of resistance grids 27 whereby to relieve the batteries of this excess charge.

The circuit for the booster 10 is provided with a 100 volt automatic cut-out 28 (see Fig. 5), with one series winding and one shunt winding which acts to close the cut-out when the voltage generated by the armature 17 reaches the necessary charging value, which can be one volt more than the battery voltage. The series winding prevents a reverse flow of current from the batteries which would otherwise energize the armature prematurely as a motor. The circuit is also provided with an ammeter 29 which registers the charging and discharging rates from zero to 300 amperes. This provides a constant indication of the drain from or generation into the batteries. If the operator observes that under certain conditions the batteries are tending to run down, he can increase the floating charging rate temporarily by manually adjusting the field rheostat 18, setting that rheostat for a higher charging rate and maintaining the advanced rate until the battery is up to normal charge. This manual increase may be necessary at rare intervals, such as after an extended lay-up period, during which the batteries 15 naturally tend to lose some of their charge. It may also be necessary during extremely cold weather, at which time the efficiency of the batteries is considerably less than at normal temperatures.

The booster 10 of course functions as a motor when carrying the starting load of the vehicle. It carries this load up to the speed at which the engine 11 can efficiently carry on. The booster must have an extremely high starting torque. The dynamoelectric machine used for this purpose should be of heavy duty direct current type, with a rating of say 20 H. P. at 1000 R. P. M., 96 volts, shunt wound, five minutes 75° C. rise. As contrasted with the internal combustion engine used, which would have a torque rating at starting speeds considerably lower than the average torque at higher or rated speeds, the booster contemplated in this organization would have an initial starting torque probably five times as great as the constant torque obtainable thereafter at higher or rated speeds. In utilizing the booster 10, instead of the engine 11, for handling the starting load and bringing the vehicle up to speed the power-developing member with the highest starting torque is employed. But it is designed to be tuned out automatically when a speed at which the engine 11 will operate efficiently is reached. From that point on the engine 11 is designed to carry the entire load.

The booster 10 can also be used to supplement the engine 11 during sudden acceleration periods, to avoid excessive gas consumption during those periods, regardless of speed. In other words, the engine 11 should act primarily as the prime mover for maintained speeds within ordinary driving ranges and the booster 10 should carry the entire load during starting and substantial portion of the load upon rapid accelerations thereafter.

This correlation of the booster 10 with the engine 11 may be accomplished by means of a device 30 (see Fig. 3) which tunes in the booster 10 temporarily when desired and gradually tunes the same out shortly thereafter. In a sense, the engine 11 overtakes the booster 10, the one tuning in as the other tunes out, with no perceptible halting or jerking incident thereto. The device includes a traveling cylinder 31 through which the push rod 25 extends from the usual foot pedal to the fuel feed arm of the engine carburetor. The cylinder 31 is normally held in its off position against a left-hand stop 32 by means of a tensioned coil spring 33. The cylinder contains a fluid 34 of constant viscosity, which fluid is sealed in the cylinder by packing rings 35 about the rod 25. The fluid 34 completely fills the cylinder at both sides of a piston 36 which is attached to the rod 25 and fits snugly within the cylinder. It will be noted that the previously described single pole circuit breaker 19 is also attached to the accelerator push rod 25 but out of the range of movement of the cylinder 31. The cylinder is provided with a rack 37 which engages with a pinion 38 on the stem of a rotary drum switch 39 which drum switch completes the circuit through the batteries to the booster 10. The batteries 15 preferably provide a total of 96 volts, with leads therefrom providing selectively for 24, 48, 72 or 96 volts, which different voltages produce the desired speeds and torques in the booster 10 when acting as a motor. When the accelerator push rod 25 returns to its left-hand off position when released the circuit breaker 19 is closed to increase the floating charge to the batteries in the manner previously described, the cylinder 31 is returned to its left-hand off position against the stop 32 by the tension of the spring 33, and the drum switch 39 is returned to its off position.

When the accelerator push rod 25 is advanced, as when starting the vehicle, the piston 36 on the rod advances with it, compressing the fluid 34 in the cylinder 31 in front of the piston, and thereby advancing the cylinder, which movement of the cylinder of course turns on the drum switch 39 and starts the booster 10, causing the vehicle to start moving with ample power available for rapid acceleration if desired. The degree of acceleration will depend upon the extent to which the drum switch is turned, which will in turn depend upon the amount of movement imparted to the rod 25.

If the rod 25, after being moved to the right to close the drum switch 39, is held in its advanced position (as when some desired speed is being maintained) the fluid 34 in front of the piston 36, which is being maintained under compression by the spring 33, will gradually escape through a vent 40 in the piston, allowing the cylinder 31 to slowly settle back against the stop 32, with which return movement of the cylinder the drum switch 39 will be returned to its off position, tuning out the booster 10 as a motor while allowing the engine 11, with its gas feed controlled by the position of the rod 25, to carry the load.

Let it be assumed that at this point the accelerator push rod, with the piston 36, is advanced one inch out of a possible six inches. The cylinder 31 has moved back against the stop 32 and the engine 11 is propelling the load at say 800 R. P. M. or 25 miles per hour. A sudden acceleration is desired from that speed up to say 50 miles per hour. To accomplish this the accelerator push rod 25 is advanced, just as with an ordinary accelerator, stepping up the fuel feed and the speed of the vehicle. During this sudden forward movement of the rod 25 the cylinder 31 again leaves the stop 32 and the drum switch 39 is closed again, bringing the booster 10 into action to supplement the engine 11. In practice the power developed by the booster 10 will actually produce the desired acceleration, rather than the engine 11, as the acceleration obtainable with the booster 10 is much more rapid than that obtainable with the engine 11. This load is carried by the booster 10 until the escaping fluid 34 has again balanced itself on opposite sides of the piston 36 and allowed the cylinder 31 to return to its off position against the stop 32. In all cases the length of time during which the booster 10 will carry the load will depend upon that period of time which it takes for the fluid 34 to escape through the vent 40, which depends upon the size of the vent, the viscosity of the fluid and the tension of the spring 33. This balance may be manually adjusted by turning the eye bolt 41 which connects the cylinder 31 with the spring 33. This period of time should ordinarily not exceed five seconds as the actual acceleration of the vehicle can be made considerably greater than present day accelerations due to the inherent characteristics of the power unit.

The piston 36 is provided with a check valve 42 which permits substantially free flow of the fluid 34 from one side of the piston to the other, whereby not to interfere with rapid movement of the rod 25 to the left as soon as pressure on the rod has been relieved. This enables the engine 11 to be quickly shut off at any time.

The drum switch 39, which is controlled or actuated mechanically by the above described acceleration correlating device, has associated with it two pilot switches 44 and 45 (see Fig. 5) and one main circuit-lead 43 which controls the armature voltage of the booster 10 when the latter is functioning as a motor. In the off position of the drum switch 39 this circuit-lead 43 is open.

As the acceleration correlating device turns the drum switch 39 into its first position (24 volts) the circuit-lead 43 is in closed position, energizing the armature of the booster 10 and causing the same to commence functioning as a motor. Further movement of the drum switch 39 increases the voltage through two more steps (48 and 72 volts) up to 96 volts at approximately a 90° movement of the drum switch 39 from its off position. Still further movement of the drum switch up to 360° merely serves to maintain the full 96 volts. The field of the dynamoelectric machine may be designed for say 8 amperes (12 ohms).

The first pilot switch 44 is normally closed, in which position it completes the field circuit and energizes the latter for the first above described type of charging rate (floating charge) as a generator. This pilot switch 44 opens as soon as the drum switch 39 energizes the armature as a motor and closes only when the drum switch returns to its off position.

The second pilot switch 45 closes with the initial movement of the drum switch 39 from its off position and remains closed as long as the drum switch is on, regardless of the position of the latter. This pilot switch permits of a maximum starting torque by delivering the full charge of 96 volts to the field.

As will be observed in the circuit diagram, a fixed resistor 46 is placed in the circuit of the pilot switch 45. This resistor incorporates resistance which is sufficient only to reduce the field strength slightly below that required for the operation of the machine as a generator (approximately one ampere decrease). This resistor is arranged in series with the governor controlled field rheostat 24, whereby the field strength is reduced in direct proportion to the motor speed. This reduction in field strength is necessary in order to enable the booster 10 to turn up and accelerate beyond its normal rated capacity.

The main control for the dynamoelectric machine is the previously described switch 26, which switch may be operated by a push and pull lever mounted in a convenient position on the steering column of the vehicle. One position of the switch closes the armature circuits for forward speeds. A second position opens all the circuits. In this open-circuit position the switch can be locked against unauthorized movement. A third position switches in the resistance grids 27. A fourth position reverses the leads to the armature, thereby reversing the direction of rotation of the booster 10 and causing a backing movement of the vehicle, at the same time opening the ignition system. Instead of reversing the direction of movement of the vehicle by means of the main switch 26 a mechanical reverse may of course be employed.

Where the vehicle is traveling up exceptionally steep grades, or is traveling under other conditions where more power is required than that which the engine 11 can efficiently produce, it may be necessary to supplement the engine 11 with the booster 10 for longer than the predetermined acceleration period of say five seconds. To bring the booster 10 into operation under these circumstances a simple manual control 47 may be provided for actuating the drum switch 39 independently of the control rod 25 and cylinder 31.

As will be understood from the foregoing description, the present invention resides primarily in the combination with the internal combustion engine 11 of the dynamoelectric machine 10 and the batteries 15, together with the acceleration controlling device which automatically correlates the operation of the fuel feeding means for the engine with the current feeding means for the dynamoelectric machine, and the brake controlling device which automatically correlates the operation of the usual braking system with the braking action afforded by the dynamoelectric machine when acting as a generator.

I claim:

1. In an automotive vehicle having a propeller shaft, a power developing unit comprising a dynamoelectric machine connected with the propeller shaft of the vehicle and having a current feed, an internal combustion engine connected with the machine and having a fuel feed, batteries for supplying current to the machine, and a single acceleration correlating device connected with both the current feed to the machine and the fuel feed to the engine for accelerating and decelerating both the machine and the engine, said device being so constructed and arranged as to cause the machine to furnish at least the preponderance of the motive power used for starting the vehicle and the engine to furnish at least the preponderance of the motive power used for subsequent operation of the vehicle.

2. In an automotive vehicle having a propeller shaft and a brake, a power developing unit comprising a dynamoelectric machine connected with the propeller shaft of the vehicle and having a current feed, an internal combustion engine connected with the machine and having a fuel feed, batteries for supplying current to the machine, a single acceleration correlating device connected with both the current feed to the machine and the fuel feed to the engine for accelerating and decelerating both the machine and the engine, said device being so constructed and arranged as to cause the machine to furnish at least the preponderance of the motive power used for starting the vehicle and the engine to furnish at least the preponderance of the motive power used for subsequent operation of the vehicle, and a brake correlating device connected with the machine and the brake of the vehicle for causing the machine to oppose the engine as a generator with consequent braking effect in the course of applying the brake.

3. In an automotive vehicle having a propeller shaft and a brake, a power developing unit comprising a dynamoelectric machine connected with the propeller shaft of the vehicle, an internal combustion engine connected with the machine, batteries for supplying current to the machine, and a single brake correlating device connected with the machine and the brake of the vehicle for causing the machine to oppose the engine as a generator with consequent graduated braking effect in the course of applying the brake, said device being operable to gradually increase or decrease the electrical and mechanical braking effects.

4. In a power developing unit for automotive vehicles, the combination with a dynamoelectric machine provided with a current feeding device, and an internal combustion engine provided with a fuel feeding device, of common control means for accelerating and decelerating both of said feeding devices, said control means being so constructed and arranged as to cause the machine to furnish the motive power for starting the vehicle and the engine to furnish the motive power for subsequent operation of the vehicle.

5. In a power developing unit for automotive vehicles, the combination with a dynamoelectric machine provided with a current feeding device, and an internal combustion engine provided with a fuel feeding device, of common control means for both of said feeding devices so constructed and arranged as to cause the machine to furnish the motive power for subsequent operation of the vehicle, said means including a movable liquid filled cylinder connected with the current feeding device, a movable acceleration rod connected with the fuel feeding device, a piston on the rod in the cylinder provided with a small escape vent, and spring means for slowly returning the cylinder to its off position after it has been advanced by the piston on the rod and while the rod remains in its advanced position.

6. In a power developing unit for automotive vehicles, the combination with a dynamoelectric machine provided with a current feeding device, and an internal combustion engine provided with a fuel feeding device, of common control means for both of said feeding devices so constructed and arranged as to cause the machine to furnish the motive power for subsequent operation of the vehicle, said means including a movable liquid filled cylinder connected with the current feeding device, a movable acceleration rod connected with the fuel feeding device, a piston on the rod in the cylinder provided with a small escape vent, and spring means for slowly returning the cylinder to its off position after it has been advanced by the piston on the rod and while the rod remains in its advanced position, said piston being also provided with a one-way check valve for permitting rapid movement of the piston in the cylinder in the reverse direction.

7. In an automotive vehicle having a propeller shaft and a brake, a power developing unit comprising a dynamoelectric machine connected with the propeller shaft of the vehicle, an internal combustion engine connected with the machine, batteries for supplying current to the machine when the latter is functioning as a motor and for storing current developed by the machine when the latter is functioning as a generator, and a single brake correlating device connected with the machine and the brake of the vehicle, said device upon actuation first causing the machine to oppose the engine as a generator with consequent graduated braking effect and thereafter causing the brake of the vehicle to be applied, said device being operable to gradually increase or decrease the electrical and mechanical braking effects.

8. In an automotive vehicle having a propeller shaft and a brake, a power developing unit comprising a dynamoelectric machine connected with the propeller shaft of the vehicle, an internal combustion engine connected with the machine, batteries for supplying current to the machine when the latter is functioning as a motor and for storing current developed by the machine when the latter is functioning as a generator, and a single brake correlating device connected with the machine and the brake of the vehicle for causing the machine to oppose the engine as a generator with consequent graduated braking effect in the course of applying the brake, said brake correlating device being operable to gradually increase or decrease the electrical and mechanical braking effects and including a pinion and rack associated with the usual brake foot pedal for converting the machine into a generator.

9. In a power driven vehicle having a driving means, a power developing unit comprising a dynamoelectric machine connected with the driving means of the vehicle and having a current feed, an internal combustion engine connected with the machine, batteries for supplying current to the machine and having a fuel feed, and a single acceleration correlating device connected with both the current feed to the machine and the fuel feed to the engine for accelerating and decelerating both the machine and the engine, said device being so constructed and arranged as to cause the machine to furnish at least the preponderance of the motive power used for starting the vehicle and the engine to furnish at least the preponderance of the motive power used for subsequent operation of the vehicle.

JOHN T. ABBOTT.

---

CERTIFICATE OF CORRECTION.

Patent No. 2,107,844.                               February 8, 1938.

JOHN T. ABBOTT.

It is hereby certified that error appears in the printed specification of the above numbered patent requiring correction as follows: Page 5, second column, line 36, claim 9, strike out the words "and having a fuel feed" and insert the same after "machine" and before the comma, line 35, same claim; and that the said Letters Patent should be read with this correction therein that the same may conform to the record of the case in the Patent Office.

Signed and sealed this 5th day of April, A. D. 1938.

(Seal)                                                                   Henry Van Arsdale,
                                                                        Acting Commissioner of Patents.